March 10, 1931.　　　M. DICKERSON　　　1,795,765
UNIVERSAL JOINT
Filed June 29, 1929
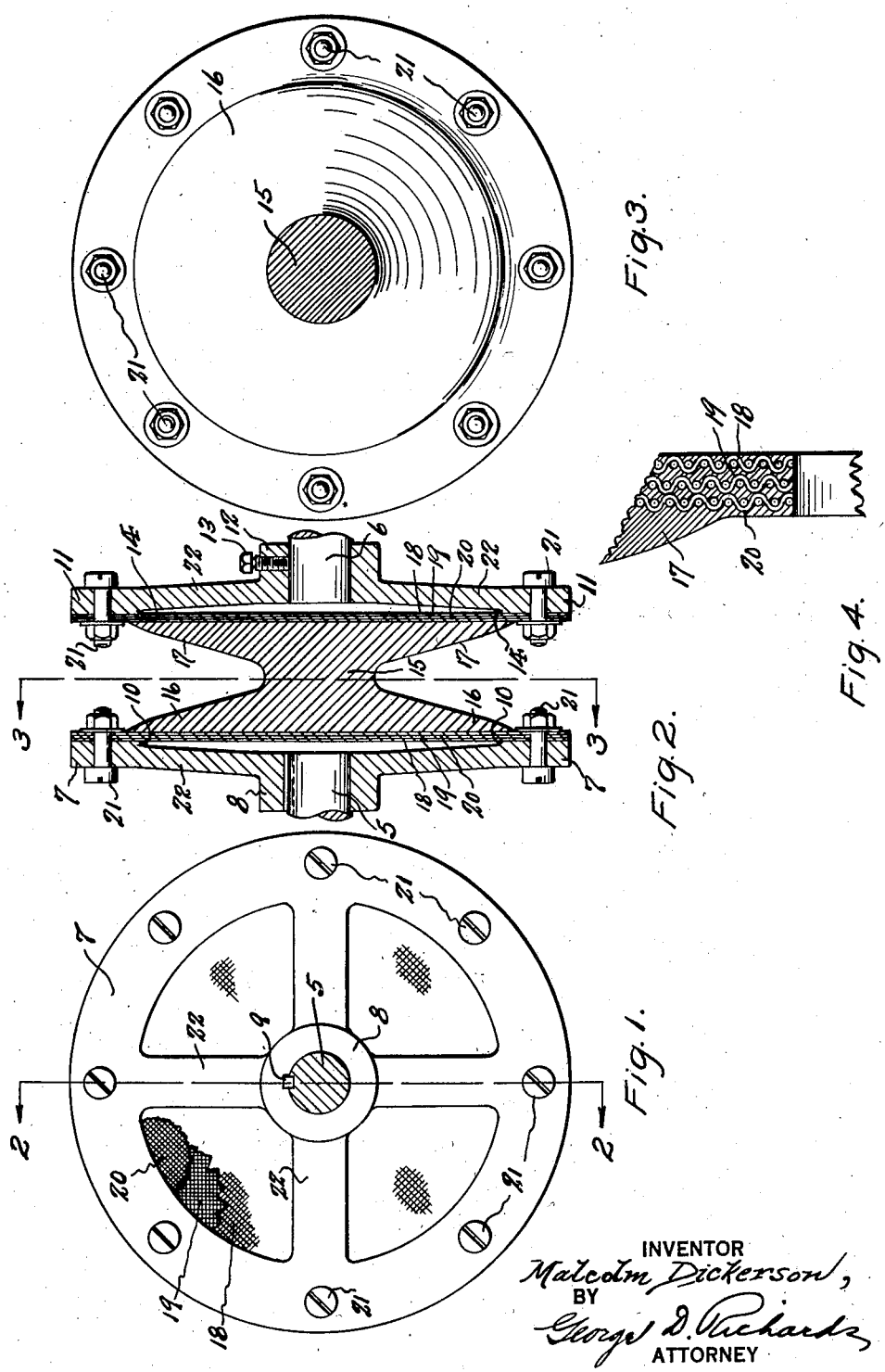
INVENTOR
Malcolm Dickerson,
BY
George D. Richards
ATTORNEY Patented Mar. 10, 1931

1,795,765

UNITED STATES PATENT OFFICE

MALCOLM DICKERSON, OF BLOOMFIELD, NEW JERSEY

UNIVERSAL JOINT

Application filed June 29, 1929. Serial No. 374,714.

This invention relates to a novel construction of universal joint for use in mechanical power transmission; and the invention has for its principal object to provide a novel construction of universal joint which, in use, is adapted to transmit a constant torque without lost motion, vibration or back-lash, and which is noiseless in operation.

The invention has for a further object to provide a novel construction of universal joint especially adapted to operatively couple axially but angularly opposed shafts for the transmission of power from one to the other thereof in such manner that rotary motion is constantly produced notwithstanding the angle of divergence of one shaft relative to the other. To this end the novel universal joint comprises a resilient solid body of vulcanized rubber having an axial center portion terminating at its ends in attachment flanges of enlarged diameter, as for example, a body substantially in the form of a hyperbola, said attachment flanges having reenforced outer face portions, whereby said body may be secured to and between annular flanges, to the hubs of which the opposed ends of the axially but angularly related shafts are respectively secured. The novel coupling body readily yields to the converging and diverging movements of the shaft coupling flanges under rotation; and the solid mass of the coupling body is calculated to exert constant torque in an efficient manner without noise.

Other objects of this invention, not at this time more particularly enumerated, will be clearly understood from the following detailed description of the same.

An illustrative embodiment of this invention is shown in the accompanying drawings, in which:—

Figure 1 is an end view of the universal joint made according to the invention, certain portions being broken away to illustrate the arrangement of reenforcing material at the face portions of the resilient coupling or joint body; Fig. 2 is a longitudinal section, taken on line 2—2 in Fig. 1; Fig. 3 is a transverse section, taken on line 3—3 in Fig. 2; and Fig. 4 is an enlarged fragmentary sectional view through a face portion of the resilient coupling or joint body per se.

Similar characters of reference are employed in the hereinabove described views, to indicate corresponding parts.

For the purposes of illustration the shaft 5 will be designated as the driving shaft, and the shaft 6 as the driven shaft. Fixed on the end of said driving shaft 5 is an annular transverse coupling flange 7 having a central hub-portion 8 to receive the shaft 5. Said shaft 5 may be secured to said hub-portion 8 by a spline or key 9, or by any other form of fastening means suitable for the purpose. Said flange 7 is preferably provided on its inner face with a marginal annular boss 10 to provide an off-set seat to receive the engagement of one face-portion of the resilient coupling body hereinafter described. In like manner, there is fixed on the opposed end of the driven shaft 6, a similar coupling flange 11 having a central hub-portion 12 to receive said shaft 6. Said shaft 6 may be secured to said hub-portion 12 by a set-screw 13, or by any other form of fastening means suitable for the purpose. Said flange 11 is also preferably provided on its inner face with a marginal annular boss 14 to provide an off-set seat to receive engagement of the opposite face-portion of the resilient coupling body hereinafter described.

The resilient coupling body comprises a comparatively soft vulcanized solid rubber mass preferably in the form of a hyperbola in longitudinal section, or any other modified body form providing diametrically enlarged flanges at its ends, central axial section 15 having at and integral with its respective ends annular diametrically enlarged attachment flanges 16 and 17. The outer end face portions of said flanges 16 and 17 are each reenforced against torsional and tearing strains by a novel arrangement of reenforcing material. This reenforcing material consists in woven fabric which is molded into the face portions of said flanges so as to be imbedded in the rubber mass. One or more layers of woven fabric may be thus incorporated in each flange of the coupling body. For maximum reenforcing strength, however, I prefer to utilize a plurality of woven fabric layers disposed in laminated relation and molded into the rubber mass so as to be imbedded therein and impregnated thereby. As shown in the drawings, there are three woven fabric reenforcing layers, 18, 19 and 20, which are overlaid one upon the other and molded into the respective flanges, although I may use more or less than three as already stated. It is also desirable, when utilizing a plurality of woven fabric reenforcing layers to have alternate layers cut on the bias from the material, so that a bias cut woven fabric layer lies between ordinary or straight cut fabric layers, as shown more particularly in Fig. 1 of the drawings. By thus alternating straight and bias cut fabric layers, the threads of the weaves are relatively disposed in various angular directions throughout the mass of the flange portions 16 and 17, whereby the strength of the reenforcement and power of the flange portions to resist torsional and tearing strains is increased to the maximum.

The diameters of the annular attachment flanges 16 and 17 are approximate to the diameters of the coupling flanges 7 and 11. When the coupling body is assembled between the coupling flanges 7 and 11 the marginal portions of said attachment flanges 16 and 17 are respectively engaged upon the seats 10 and 14, and the thus engaged parts are secured together by any suitable number of bolts 21, annularly spaced apart at suitable intervals, thus rigidly interconnecting the resilient coupling body to and between the coupling flanges 7 and 11, whereby rotary motion is transmitted through the coupling body from one coupling flange and the attached shaft, as 7—5, to the other coupling flange and the attached shaft, as 11—6.

In order to reduce the mass and weight of the coupling flanges 7 and 11 if desired, the same may be cut away intermediate their hubs and the outer marginal portions thereof as to provide radial connecting arms intermediate said parts.

It will be obvious, when the shafts 5 and 6 are axially opposed in angular relation one to the other, that the driving torque of the former will be efficiently and noiselessly transmitted to the latter through the resilient coupling or joint body; the solid but resilient mass of which is adequate to transmit the involved rotary motion, while the integral attachment flanges 16—17 are adapted to yield or conform to the angular displacements of the opposed rotating coupling flanges to which the angularly disposed shafts are secured, so that a positive and quiet transmission of power from one shaft to the other is attained without vibration, back-lash or lost motion.

The novel disposition and character of the fabric reenforcing material relative to the attachment flanges 16—17 imparts to the face portions thereof a residual rigidity and toughness adequate to assure the necessary mechanical firmness of the connections thereof to the coupling flanges 7—11, so that risk of breakage or tearing is eliminated without loss of resiliency necessary to the flexing action required thereof during driving rotation.

As many changes could be made in the structure above described and shown in the accompanying drawings without departing from the spirit and scope of this invention, it will, therefore, be understood that said description and the showing of aid drawings are to be taken as illustrative and not in a limiting sense.

Having thus described my invention, I claim:—

1. In a universal joint for coupling angularly aligned shafts, coupling flanges to which said shafts are respectively secured, and a solid rubber joint body in the form of a hyperbola the enlarged end portions of which provide attachment flanges repectively contiguous to said coupling flanges, woven fabric reenforcing material imbedded and molded into said attachment flanges in plane substantially parallel to the end face thereof, and fastening elements extending through and securing together the marginal portions of contiguous coupling and attachment flanges.

2. In a universal joint for coupling angularly aligned shafts, coupling flanges to which said shaft are respectively secured, and a solid rubber joint body having enlarged end portions in a plane transverse to the longitudinal axis thereof to provide attachment flanges respectively contiguous to said coupling flanges, fibrous reenforcing material imbedded and molded into said attachment flanges in plane substantially parallel to the outer faces thereof and coextensive therewith, and fastening elements extending through and securing together the marginal portions of contiguous coupling and attachment flanges.

In testimony that I claim the invention set forth above I have hereunto set my hand this 17th day of June, 1929.

MALCOLM DICKERSON.